United States Patent [19]

Jancek et al.

[11] 4,095,988

[45] Jun. 20, 1978

[54] SELF HARDENING SUSPENSION FOR FOUNDATION ENGINEERING PURPOSES

[75] Inventors: Viliam Jancek; Jan Gresa, both of Bratislava, Czechoslovakia

[73] Assignee: Vyskumny ustav inzenierskych stavieb, Bratislava, Czechoslovakia

[21] Appl. No.: 738,106

[22] Filed: Nov. 2, 1976

Related U.S. Application Data

[63] Continuation-in-part of Ser. No. 596,508, Jul. 16, 1975, abandoned.

[30] Foreign Application Priority Data

Jul. 19, 1974 Czechoslovakia .................. 6298/74

[51] Int. Cl.$^2$ ............................ C04B 7/02; C04B 7/00
[52] U.S. Cl. ........................................ 106/97; 106/85
[58] Field of Search ................................. 106/85, 97

[56] References Cited

U.S. PATENT DOCUMENTS

| 1,627,952 | 5/1927 | Brookby | 106/97 |
| 2,446,990 | 8/1948 | Schuetz | 106/97 |
| 3,522,068 | 7/1970 | Bastian et al. | 106/97 |

*Primary Examiner*—Patrick P. Garvin
*Assistant Examiner*—William G. Wright
*Attorney, Agent, or Firm*—Burgess, Ryan and Wayne

[57] ABSTRACT

There is provided a self-hardening suspension useful for example in the preparation of foundations. This suspension comprises water, cement, bentonite and hydraulic lime and also containing stabilizers, setting regulators, plasticizers and the like. Such a self-hardening suspension when used in foundation engineering such as walls, exhibits high stability.

10 Claims, No Drawings

SELF HARDENING SUSPENSION FOR FOUNDATION ENGINEERING PURPOSES

This application is a continuation-in-part of U.S. Pat. application Ser. No. 596,508 now abandoned filed Jul. 16, 1975.

It is known to prepare self-hardening suspensions comprising bentonite pulp and slow setting cement. The experience proved that one can employ any kind of cement while adding retardants. The amount of cement and bentonite per 3 cubic meters of suspension is governed by requirements on sheeting and strength properties of the suspension and of the hardened mass. These suspensions are used for fashioning bearing and waterproof walls by pouring into earth ditches in combination with foils of plastic, stone aggregates and precastings. As for grouting, (injecting) ashes are sometimes used.

A disadvantage of these self-hardening suspensions lies in the necessity of observing technological time intervals between the preparation of the bentonite suspension and the addition of cement into it.

Another disadvantage of these self-hardening suspensions used for sealing purposes is their capability to accept only a relatively small quantity of bentonite.

Another disadvantage of these suspensions is foaming when mixing in hardening retardants with the aim to postpone the setting rate longer than 24 hours.

There is a volume mass shrinkage of the suspension and after hardening, air cavities are present which have an unfavorable influence on strength.

To reduce foaming of the suspension defoamers are employed which influence the suspension in both liquid and solid states.

The above mentioned disadvantages are overcome by the self-hardening suspension prepared according to the present invention so that there need not be any technological interval during its production. This makes the production substantially simpler and the same equipment can achieve substantially greater volume outputs.

The self-hardening suspension produced according to our invention, intended to be waterproof, can contain a substantially higher amount of bentonite, which improves the sealing property of the hardened mass. The amount of Bentonite influences the strengths of these self-hardening suspensions.

The self-hardening suspension prepared according to the invention produces substantially less foaming while simultaneously postponing the beginning of setting. With time, the foaming of the liquid mixture is lost so that in a hardened state there are few air cavities remaining which can exert an unfavorable influence on the sealing and strength properties of the hardened mass.

Another advantage of the self-hardening suspension produced according to the invention lies in a higher variability of its properties in liquid and solid states, in its production and use.

The subject of the invention is a self-hardening suspension for the needs of foundation engineering with properties guaranteeing a stability of the walls of the foundation ditches and auger holes when fashioning them, when installing reinforcement irons, netting, foils, concrete mixture, precastings, etc. while this suspension is changed into solid mass of strengths that are higher in comparison with the surrounding earth. The suspension is prepared of at least three basic groups of substances, viz. water, powder masses, setting regulators, and stabilizers. The powder masses are a combination of 10% up to 40% of cement, 2% up to 18% of bentonite, 1% up to 15% of hydraulic lime, ashes up to 15% and latently hydraulic and filling masses up to 40% of e.g., ground slag, ground ceramics, etc. and stabilizers, setting regulators, and plasticizers. (The indicated percentage refers to volume). The weight ratio of water and powder masses is within the limits of 0.5 up to 6.5 to 1.

The stabilizers, setting regulators and plasticizers are generally known and their dosage depends on their properties, on the properties of the masses in the mixture and on the properties required from the suspension.

As used herein, latently hydraulic materials or masses refers to compositions which coact with one or more compositions in the suspension to cause hydraulic hardening or setting of the mixture. In example (a) the blast furnace slag is a latently hydraulic composition which coacts with the hydraulic lime to cause setting of the mixture. In contrast pure Portland cement hardens without other additives when contacted with water.

As used herein filling materials or masses refers to compositions which are substantially inactive or inert materials which do not participate to a significant extent in the physicochemical process of solidifying and hardening (setting) of the suspension.

As used herein, stabilizers refer to compositions which significantly influence the properties of the suspensions. The stabilizers increase the structural strength of the suspension and prevent or retard sedimentation of relatively heavy grains or large particles from the mixture.

As used herein setting regulators, hardening agents and controlling agents refer to compositions which are utilized to control the rate at which the suspension of the present invention hardens or sets.

As used herein plasticizers refer to compositions which when added to the suspension improves the rheological properties. The compositions are surface active agents or surfactants which when added to the suspension make it more flowable or liquid-like so that it can be more easily utilized in the intended application.

The latently hydraulic materials, filling materials, stabilizers, setting regulators, hardening agents, controlling agents and plasticizers are well known in the art and need not be discussed herein. The nature and utility of the composition can be found in articles and books in the field of coarse size dispersion systems and doped cement containing slurries. In particular, latently hydraulic materials are discussed in Maltoviny (Mortar Materials) by Professor Dr. Ing. V. Figus.

WORKING PROCEDURES OF PRODUCTION OF SELF-HARDENING SUSPENSION

The self-hardening suspension can be prepared as follows:

(1) One-phase way — the suspension is prepared in an equipment of high effect of activation and homogenization.

(2) Two-stage way without technological interval:
  (a) prepared in the first phase is the bentonite suspension;
  (b) in the second phase there are added to the bentonite suspension the other masses and after homogenization the suspension is ready for use. The second phase follows as to time immediately the first phase.

(3) Three-phase way with technological interval:

(a) in the first phase we prepare the bentonite suspension; the bentonite suspension is left to ripen for a time depending on its properties, on the amount of bentonite, intensity of activation and homogenization of bentonite;

(b) in the second phase added in the bentonite suspension are, after a certain time, the remaining masses.

(4) Three-phase way without or with technological intervals:

(a) the first phase lies in preparation of the bentonite suspension.

(b) the second phase means adding of hydraulic lime in the bentonite suspension.

(c) the third phase means adding of the remaining masses.

(d) between the individual phases there are or there are no technological intervals.

(5) A multi-phase way of suspension production, as well as changes in the sequence of adding masses (except for bentonite) are possible.

The most advantageous working procedure depends on the properties and amounts of masses in the mixture, on the production equipment, economy of time, laboriousness and production costs of the self-hardening suspension.

Execution examples (according to various circumstances):

A self-hardening suspension can be prepared of:

(a)
68% of water
18.2% of cement
5.7% of bentonite
2% of hydraulic lime
2% of ashes
2% of slag
1.2% of liquid plasticizer (b)
60.9% of water
26.2% of cement
6% of hydraulic lime
5.3% of bentonite
1.6% of liquid plasticizer The amounts of the individual components in the mixture depend according to the required properties of the suspension in liquid and solid state on the purpose of its use (for sealing, structural, sealing and structural elements, for grouting, etc.).

Added to the mixtures can be various setting retardants, plasticizers and stabilizers which are generally known.

The mass originated by solidification of the self-hardening suspension produced according to the invention can be employed as a bearing depth-foundation element. This mass can also be used in combination with steel reinforcement, stone aggregates, concrete and reinforced concrete. Further, it can be used for sealing walls in connection with foils, wall plates, girders or without these.

The self-hardening suspension according to the invention can be used as a sheeting grout and injection (grouting) mass.

Deep foundation structures made with the use of the suspension according to the invention may be stressed by vertical, horizontal and combined forces, as well as by bending and/or torsion stresses.

We claim:

1. A self-hardening suspension for foundation engineering consisting essentially of by volume (a) 40 to 80% water, (b) a powder mass consisting essentially of from 10 to 40% cement, 2 to 18% bentonite, 1 to 15% hydraulic lime, 0 to 15% ashes and 0 to 40% ground slag and filling materials, and wherein the ratio by weight between water and powder mass is in the range of 0.5:1 to 6.5:1.

2. A self-hardening suspension of claim 1 which includes at least one plasticizer.

3. A self-hardening suspension according to claim 2 which comprises about 68% water, about 18.2% cement, about 5.7% bentonite, about 2% hydraulic lime, about 2% ashes, about 2% slag and about 1.2% liquid plasticizer.

4. A self-hardening suspension according to claim 2 which comprises about 60.9% water, about 26.2% cement, about 6% hydraulic lime, about 5.3% bentonite and about 1.6% liquid plasticizer.

5. A self-hardening suspension of claim 1 which includes at least one setting regulator.

6. A self-hardening suspension of claim 1 which includes at least one stabilizer for preventing or retarding sedimentation of relatively heavy grains or large particles and increasing the structural strength of the suspension.

7. A self-hardening suspension of claim 1 which includes at least one plasticizer and at least one setting regulator.

8. A self-hardening suspension of claim 1 which includes at least one plasticizer and at least one stabilizer for preventing or retarding sedimentation of relatively heavy grains or large particles and increasing the structural strength of the suspension.

9. A self-hardening suspension of claim 1 which includes at least one setting regulator and at least one stabilizer for preventing or retarding sedimentation of relatively heavy grains or large particles and increasing the structural strength of the suspension.

10. A self-hardening suspension of claim 1 which includes at least one plasticizer, at least one setting regulator and at least one stabilizer for preventing or retarding sedimentation of relatively heavy grains or large particles and increasing the structural strength of the suspension.

* * * * *